United States Patent [19]

Weintraub et al.

[11] Patent Number: 4,693,947

[45] Date of Patent: Sep. 15, 1987

[54] SYSTEM FOR AGITATING THE ACID IN A LEAD-ACID BATTERY

[75] Inventors: Alvin Weintraub, Schenectady; Robert S. MacCormack, Glenville, both of N.Y.

[73] Assignee: The United States of America as represented by the United States Department of Energy, Washington, D.C.

[21] Appl. No.: 854,363

[22] Filed: Apr. 21, 1986

[51] Int. Cl.4 .............................................. H01M 2/38
[52] U.S. Cl. ....................................... 429/51; 429/67; 429/72
[58] Field of Search ...................... 429/67, 71, 72, 81, 429/51

[56] References Cited

U.S. PATENT DOCUMENTS 3,040,116  6/1962  Gauvin .............................. 429/71 X
4,269,906  5/1981  Schmechtig .......................... 429/67
4,557,984 12/1985  Offidani ............................. 429/67

FOREIGN PATENT DOCUMENTS 893885  4/1962  United Kingdom .................. 429/67

Primary Examiner—Anthony Skapars
Attorney, Agent, or Firm—William W. Randolph; Judson R. Hightower; Richard E. Constant

[57] ABSTRACT

A system and method for agitating the acid in a large lead-sulfuric acid storage battery of the calcium type. An air-lift is utilized to provide the agitation. The air fed to the air-lift is humidified prior to being delivered to the air-lift.

5 Claims, 1 Drawing Figure

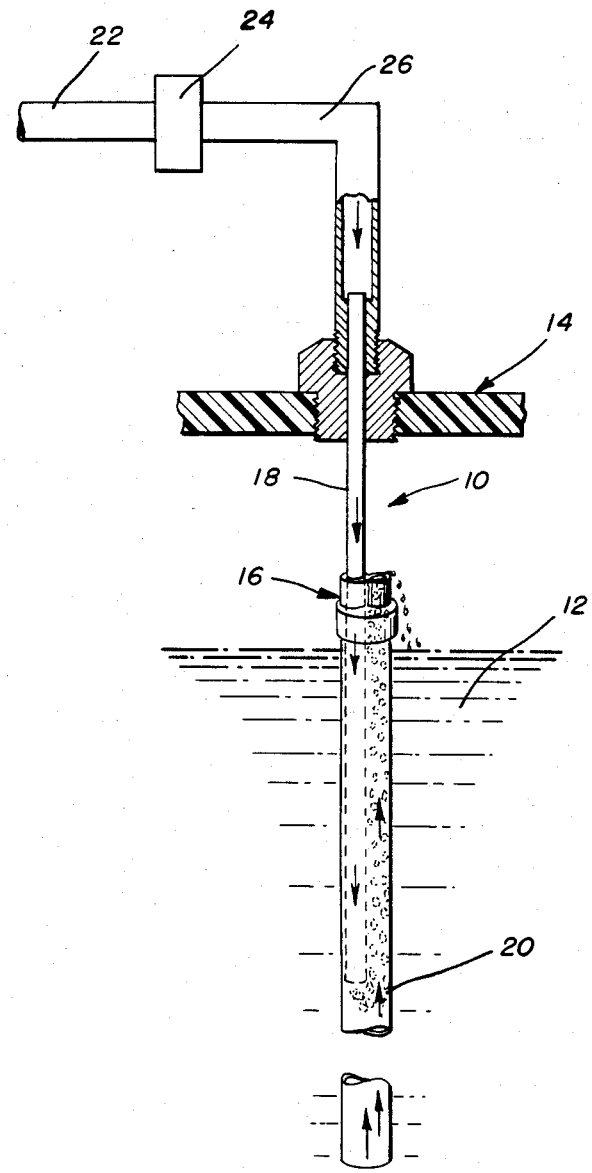

SYSTEM FOR AGITATING THE ACID IN A LEAD-ACID BATTERY

BACKGROUND OF THE INVENTION

1. Field of the Invention

The present invention relates to a system of agitation of the acid in a large lead-sulfuric acid storage battery. More specifically, the present invention relates to a system and method of agitating the acid in large lead-sulfuric acid batteries of the calcium type through the use of an air-lift.

2. Description of the Related Art

In large lead-sulfuric acid batteries of the calcium type, during a charging operation, lead sulfate on both electrodes is converted to sulfuric acid as the positive electrode is converted to $PbO_2$ and the negative electrode is converted from lead sulfate to metallic lead. The solution of sulfuric acid which forms as a film at the electrode-electrolyte interface is more concentrated than the ambient acid and tends to sink to the bottom of the cell because it is more dense. Conversely, during discharge operations, the reverse takes place. The sulfate radical leaves the solution to react with each electrode, and the concentration of the sulfuric acid in the film by the electrode becomes less concentrated than the ambient acid and tends to rise to the top because it is less dense. If this segregation of acid were permitted to continue, the capacity of the battery to deliver power would be reduced and the battery cell could be ruined. To restore the sulfuric acid to a uniform concentration, each cell is provided with air lifts which operate continuously and raise the acid from the bottom to the top. An air lift consists of a pair of tubes of special design. The inner tube descends down into the acid; the outer tube of larger dimensions surrounds the inner tube and extends almost to the bottom of the acid. The outer tube has a side opening just above the level of the acid. When air is sparged from the inner tube into the acid, bubbles rise within the outer tube and lift acid from the bottom of the cell to the outlet of the outer tube where it is discharged back into the acid at the top of the cell. Thus, the acid is continually mixed to obtain a uniform concentration from bottom to top.

The sparger tube at the bottom of the air lift slowly becomes plugged with a precipitate of calcium sulfate and has to be cleaned or replaced. The necessary periodic inspection and replacement of sparger tubes requires a considerable effort.

SUMMARY OF THE INVENTION

Accordingly, it is a primary object of the present invention to provide an improved system of agitation of the acid in a large lead-sulfuric acid battery of the calcium type so that the replacement of the sparger tubes is reduced.

It is a further object of the present invention to reduce the replacement of sparger tubes by virtually eliminating the plugging of these tubes.

Another object of the present invention is to eliminate plugging of the sparger tubes with a precipitate of calcium sulfate from the battery acid. The calcium comes from the electrodes and other parts of the battery cell.

Other objects and further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

In accordance with the present invention a humidifier is provided for the air to the sparger tubes. When an air lift is operated, a bubble of air will grow at the bottom of the tube until it becomes too large to remain under the tube. At that time, it slips off on one side and rises toward the surface of the acid. As the bubble leaves the opening in the bottom of the tube, some acid rushes up the sparger tube for about ⅛", and then is quickly pushed out by the new air. Thus, a film of acid wets the inside of the bottom of the sparger tube as each bubble leaves. If dry air is leaving the sparger tube, it will evaporate water from a film of battery acid inside the bottom of the sparger tube and cause the acid to become more concentrated and cooler. When the calcium sulfate in solution becomes saturated, some of the calcium sulfate can precipitate on the inside of the tube. Although the amount of calcium sulfate precipitate formed by any one bubble is miniscule, the acid rising up after each bubble leaves will deposit new calcium sulfate when the next bubble occurs. Since several bubbles leave each tube every second, the amount of calcium sulfate precipitate formed becomes significant.

If the bubbles are made up of humidified air leaving the sparger tube, the humidified air will be partially dehydrated by the film of acid in the bottom of the tube, thus diluting the acid and raising its temperature by the latent heat of the water absorbed. The solubility of calcium sulfate increases as $H_2SO_4$ acid concentration (30–40%) decreases and as temperature (70°–140° F.) increases. Thus, diluting the acid and raising its temperature will prevent the precipitation of calcium sulfate and will tend to dissolve any solid calcium sulfate which happens to be present in the tube.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

The sole FIGURE is a diagrammatic view of the humidified air system of the present invention connected to an air lift in a battery cell.

DESCRIPTION OF THE PREFERRED EMBODIMENT

Referring in detail to the drawing, there is illustrated a battery cell generally indicated 10, which includes electrolyte 12 and a cell cover 14. The battery cell may be about two feet square and three or more feet deep. Each cell may contain 40 gallons or more of acid, which is about 38% $H_2SO_4$ when fully charged. The sparger tube or inner tube 18 of an air lift 16 passes through the cell cover. The inner tube may be thin-walled polyethylene with an inside diameter of about 3 mm. and descends down into the acid. The outer tube 20 has larger dimensions and surrounds the inner tube. The outer tube extends almost to the bottom of the acid. Air is fed under pressure through the inner tube 18 of the air lift and then the air bubbles up the outer tube 20 of the air lift. The bubbles carry with them electrolyte from lower down in the battery.

The air being supplied for use in the sparger or inner tube is delivered by a manifold through an orifice which meters the flow evenly to all the sparger tubes on the manifold. The air is generally supplied by a compressor at 100 psig or more. Moisture present as humidity condenses and is removed by a separator. Then the dry air is brought through a pressure regulator to a flow meter and throttle valve to supply the manifold, noted above, with the air for all downstream sparger tubes. The pressure in the manifold is about 1 psig. The dry air being delivered to the sparger tubes is shown at 22 in the FIGURE. This air is passed through a humidifier 24 so that the air actually passing through the air lift is humidified air 26.

In operation, the bubbles of humidified air provide moisture which acts to deter the formation of solid calcium sulfate by increasing the solubility of the calcium sulfate. This occurs since the moisture dilutes the acid and raises its temperature by the latent heat of the water absorbed.

It is advantageous to locate the humidifier outside the battery compartment, so that the water can never cause an electrical short-circuit in or around the batteries. Also, a location outside the battery compartment provides that inspection of the humidifier and replenishment of its water will be simplified and convenient.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. The method of agitating acid in a lead-acid battery which comprises the steps of passing compressed air through a humidifier, delivering said compressed humidified air to an air-lift in a battery cell containing acid and bubbling said air up through said air-lift to agitate said acid.

2. A system for agitating acid in a lead-acid battery comprising a battery including a cell containing acid and having a cover, an air lift including an inner tube and an outer tube, said inner tube passing through said cell cover, and humidifier means to supply humidified compressed air connected to said inner tube so that said acid will be agitated by air bubbles rising in said outer tube and so that the humidified air will reduce precipitation of deposits on said inner and outer tubes.

3. A system for agitating acid in a lead-acid battery as in claim 2, wherein said humidifier means to supply humidified compressed air includes a humidifier.

4. A system for agitating acid in a lead-acid battery as in claim 2, wherein said outer tube extends almost to the bottom of said acid.

5. A system for agitating acid in a lead-sulfuric acid battery of the calcium type comprising a battery including a cell containing sulphuric acid and having a cover, an air lift including an inner tube and an outer tube, said inner tube passing through said cell cover, and humidifying means connected to said inner tube for supplying humidified air thereto, so that the acid will be agitated by air bubbles rising in said outer tube and so that the humidified air will reduce precipitation of calcium sulfate deposits on said inner tube.

* * * * *